United States Patent
Thielman et al.

(10) Patent No.: US 7,924,306 B2
(45) Date of Patent: Apr. 12, 2011

(54) VIDEOCONFERENCING WITH ENHANCED ILLUSION OF PHYSICAL PRESENCE IN A COMMON SPACE

(75) Inventors: Jeffrey Thielman, Corvallis, OR (US); Mark E Gorzynski, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1242 days.

(21) Appl. No.: 11/521,634

(22) Filed: Sep. 15, 2006

(65) Prior Publication Data
US 2008/0068443 A1    Mar. 20, 2008

(51) Int. Cl.
H04N 7/14    (2006.01)

(52) U.S. Cl. .................. 348/14.1; 348/14.08; 348/14.09

(58) Field of Classification Search .... 348/14.01–14.16; 345/207; 362/33
See application file for complete search history.

(56) References Cited

U.S. PATENT DOCUMENTS

| | | | |
|---|---|---|---|
| 5,751,337 A | 5/1998 | Allen et al. | |
| 5,764,306 A * | 6/1998 | Steffano | 348/586 |
| 6,008,838 A | 12/1999 | Iizawa | |
| 6,091,447 A | 7/2000 | Gershfeld | |
| 6,380,968 B1 | 4/2002 | Alexander et al. | |
| 6,380,990 B1 | 4/2002 | Bessel | |
| 6,453,336 B1 | 9/2002 | Beyda et al. | |
| 6,529,231 B1 * | 3/2003 | Yoshida | 348/14.08 |
| 6,614,465 B2 | 9/2003 | Alexander et al. | |
| 6,633,324 B2 | 10/2003 | Stephens, Jr. | |
| 6,654,048 B1 | 11/2003 | Barrett-Lennard et al. | |
| 6,654,825 B2 | 11/2003 | Clapp et al. | |
| 6,680,746 B2 | 1/2004 | Kawai et al. | |
| 6,693,661 B1 | 2/2004 | Vanderwilt et al. | |
| 6,853,398 B2 | 2/2005 | Malzbender et al. | |
| 6,965,399 B1 | 11/2005 | Oka et al. | |
| 6,989,856 B2 | 1/2006 | Firestone et al. | |
| 7,023,470 B2 | 4/2006 | Braun | |
| 7,089,285 B1 | 8/2006 | Drell | |
| 7,095,455 B2 | 8/2006 | Jordan et al. | |
| 7,612,794 B2 * | 11/2009 | He et al. | 348/14.08 |
| 2005/0073530 A1 | 4/2005 | Kapur et al. | |
| 2005/0213739 A1 | 9/2005 | Rodman et al. | |
| 2007/0285507 A1 * | 12/2007 | Gorzynski | 348/14.12 |

FOREIGN PATENT DOCUMENTS

| | | |
|---|---|---|
| GB | 2 332 323 A | 6/1999 |
| WO | 03049438 A | 6/2003 |

OTHER PUBLICATIONS

International Search Report and Written Opinion—PCT/US2007/078033—International Filing Date Oct. 9, 2007—Applicant: Hewlett-Packard Development Company.

* cited by examiner

*Primary Examiner* — Melur Ramakrishnaiah

(57) ABSTRACT

A technique for enhancing the illusion of physical presence in a common space during a multipoint video conference is disclosed. The technique may include controlling the appearance of a first portion of the video images separately from an appearance of a second portion of the video images to achieve a consistent image appearance across the multipoint videoconference.

20 Claims, 3 Drawing Sheets

VIDEOCONFERENCING WITH ENHANCED ILLUSION OF PHYSICAL PRESENCE IN A COMMON SPACE

BACKGROUND

Face to face meetings are a mainstay of the business world. Face to face meetings are particularly important to coordinate activities when a project team is dispersed across multiple geographic locations. While getting meeting participants together in one room is easy when all participants are located in the same office, this is difficult when some team members must travel. The value of face to face interaction is demonstrated by the cost and inconvenience of the extensive business travel that businesses incur to facilitate face to face meetings. On one hand, dispersed teams are becoming more common with the increasing globalization of business. On the other hand, air travel is being subjected to increased security procedures causing additional inconvenience and lost productivity for business travelers. Accordingly, alternatives to travel that can obtain similar benefits as face to face meetings are increasingly being sought.

Videoconferencing offers a convenient alternative to travel. While many different videoconferencing systems have been developed, videoconferencing has so far failed to make major inroads into replacing travel as a means for facilitating face to face meetings. Perhaps the greatest reason that videoconferences have not achieved hoped for benefits is that most systems do not provide a sense of actually being present in the same room as the other parties. One factor that inhibits the parties from feeling they are in the same room together is visual cues that highlight differences in the parties' respective environments. These visual cues are distractions that shift the attention of videoconference participants away from each other and towards the technology being used (and the limitations of that technology). The resulting quality of interaction is reduced, and becomes a poor substitute for being physically in each other's presence.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

DETAILED DESCRIPTION OF EXAMPLE EMBODIMENTS

In describing embodiments of the present invention, the following terminology will be used.

The singular forms "a," "an," and "the" include plural referents unless the context clearly dictates otherwise. Thus, for example, reference to "a camera" includes reference to one or more of such cameras.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, the term "about" means that dimensions, sizes, formulations, parameters, shapes and other quantities and characteristics are not and need not be exact, but may be approximated and/or larger or smaller, as desired, reflecting tolerances, conversion factors, rounding off, measurement error and the like and other factors known to those of skill in the art.

Reference will now be made to the exemplary embodiments illustrated, and specific language will be used herein to describe the same. It will nevertheless be understood that no limitation of the scope of the invention is thereby intended.

To enhance the illusion of videoconference participants being in the same room together, it is helpful to match the appearance of video images from the respective videoconferences sites. One factor to which participants are particularly sensitive is the background portion of the video images. While viewer focus tends to be on videoconference participants and objects in the foreground portion of the image, clutter or other distractions in the background can shift the viewer focus away from the more important foreground portion of the image. In particular, differences between the background being displayed from a remote site and the local background tend to reduce any illusion of being present in a common space. In multipoint videoconferences, multiple displays may be positioned near each other while showing images from different sites. This can make any differences in the backgrounds highly visible, further reducing any illusion of presence in the same room together.

Figure 1:
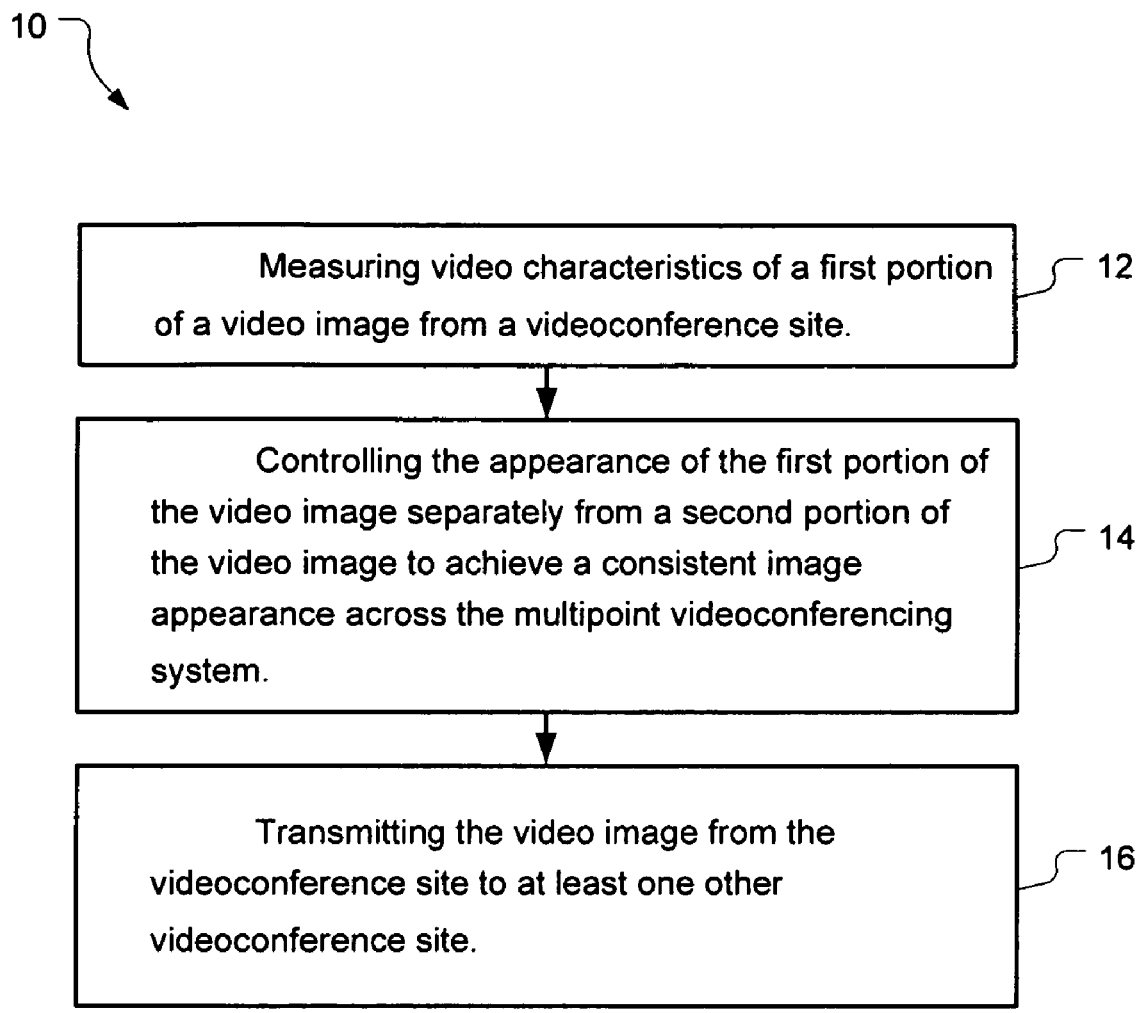
FIG. 1 is a flow chart of a method of enhancing the illusion of physical presence in a common space in accordance with an embodiment of the present invention.

Accordingly, one embodiment of the present invention is a method of enhancing the illusion of physical presence in a common space. The method can be applied to a multipoint videoconferencing system. FIG. 1 illustrates a flow chart of the method in accordance with an embodiment of the present invention. The method, shown generally at 10, can include measuring 12 video characteristics of a first portion of a video image from a videoconference site. By controlling 14 the appearance of the first portion of the video image separately from a second portion of the video image, the appearance of the portions of the video image can be adjusted to achieve a consistent appearance across the multipoint videoconferencing system. For example, the appearance of a foreground portion and a background portion can be controlled separately. The method can also include transmitting 16 the video image from the videoconference site to a plurality of other videoconference sites.

For example, controlling the appearance of the background portion of the video image separately from the foreground portion of the video image helps to enable matching of background portions without upsetting color or lighting in the foreground portion. Lighting, color, or other environmental factors can result in a different appearance of the back wall of a videoconference site. Performing an adjustment to the entire video image to normalize the background to a desired characteristic, while matching the backgrounds, can result in significant distortions to the foreground portion of the image. Accordingly, it is helpful to separate background adjustments from foreground adjustments.

Measuring the background portion of the video image can include comparing the background portion of the video image to a desired background image. For example, the comparison can produce an error metric which is used for feedback control of equipment settings within the videoconference site. Various ways of measuring the background portion are possible. Measurements may be performed on the video image after capture by a video camera, for example, by measuring intensity or color levels of the video image. Alternately, measurements may be performed using a light sensor or sensors within the videoconference site. As yet another example, measurements may be indirect, for example, based on iris settings for autolevel setting cameras and the like.

Figure 2:
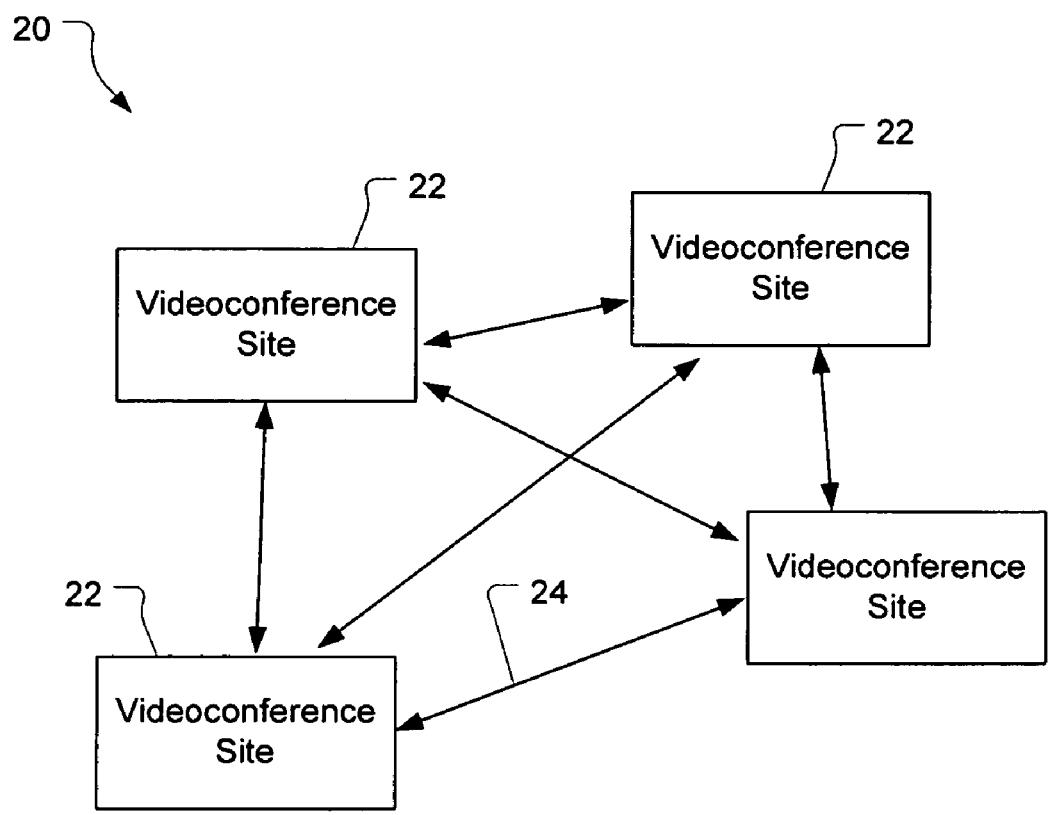
FIG. 2 is a block diagram of a multipoint videoconference system in accordance with an embodiment of the present invention.

FIG. 2 illustrates a multipoint videoconference system in accordance with an embodiment of the present invention. The multipoint videoconference system, shown generally at 20, includes a plurality of videoconference sites 22. The videoconference sites may include means for communication with at least one other video conference site to exchange video images to form a multipoint videoconference. For example, two videoconference sites can be in communication with each other via videoconference links 24 to form a two-way videoconference. As another example, four sites can be in communication with each other to form a four-way videoconference. The videoconference links can be provided, for example, by video transmission and reception over wired and wireless transmission medium, such as public or private data networks, satellite transmission, and the like.

Figure 3:
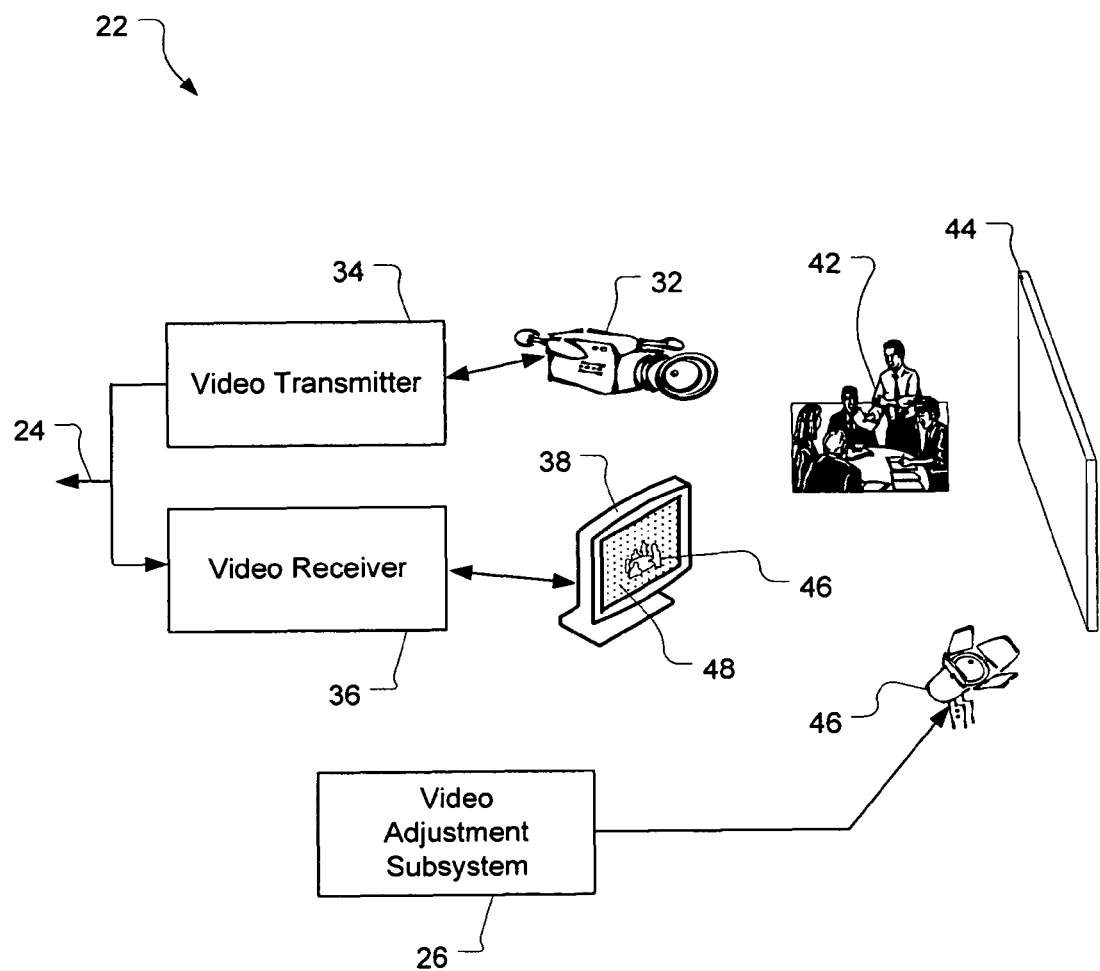
FIG. 3 is a detailed block diagram of a videoconference site in accordance with an embodiment of the present invention.

One particular detailed example of a videoconference site 22 is illustrated in FIG. 3 in accordance with an embodiment of the present invention. The videoconference site can include a video camera 32, a video transmitter 34, a video receiver 36 and a video display 38. The video camera 32 provides for capturing video images within the videoconference site. The video camera is coupled to the video transmitter to transmit outgoing video images to at least one other videoconference site. The video receiver receives incoming video images from at least one other videoconference site which are displayed on the video display. Multiple images from different videoconference sites may be stitched onto the display. Of course, the videoconference site can include multiple cameras and multiple displays. For example, multiple displays may be positioned side by side, each display providing an image from a different videoconference site.

The video camera 32 captures video images of the videoconference site, which are a combination of various areas within the videoconference site. For example, the videoconference site may include a foreground area 42 and a background area 44. The foreground portion area may include a conference table, chairs, participants in the videoconference, and objects sitting on the conference table. A background area may be a back wall of the video conference site. Video images of the videoconference site thus include a first, for example, foreground, portion 46 and a second, for example, background, portion 48 of the video image. In general, video images may include many different portions corresponding to different areas within the video conference site.

The videoconference site 22 may include a means for controlling the appearance of a first portion of the video images separately from a second portion of the video images. For example, a video adjustment subsystem 26 may be coupled to the videoconference site to control appearance of the background portion to provide a consistent image appearance across the multipoint videoconferencing system.

Various alternative ways of configuring the video adjustment subsystem 26 can be used as will now be described. In one embodiment, as shown in FIG. 3, the video adjustment subsystem may be coupled to at least one light 46 positioned to light an area within the video conference site, for example a back wall. The video adjustment system can control lighting levels, lighting colors, lighting positions, and the like for the back wall separately from lighting in the foreground area 42 of the video conference site. Of course, different first and second portions of the video image may be adjusted. For example, the first portion may be a side portion of an image and a second portion may be a background. As another example, the first portion may be an object in the foreground, and the second portion may be the foreground portion. Although the present description is provided primarily in terms of images divided into two portions, it should be appreciated that appearance of three or more portions of the video image may be controlled separately using the disclosed techniques. For example, lighting levels may be adjusted to separately control appearance of a foreground portion, a particular object in the foreground, side wall portions, and back wall portions of the video image.

Setting of lighting levels and color may proceed as follows. Lighting can be set in the foreground area 42 of the video conference site to produce a desired level of illumination. Measurement of the lighting levels may be performing using equipment within the video conference site, such as light meters or the video camera 32. Measurement may be performed or controlled by a remote calibration studio (not shown). Lighting can then be set for the background to achieve a desired background appearance. For example, a desired lighting intensity may be set to produce about a 50% intensity for a given color, the 0% and 100% intensity level limits being defined by the overall intensity limits for the videoconferencing system. It should be appreciated that the appearance of the background portion of the video images from the camera can thus be controlled separately from the foreground portion of the video images, allowing desired characteristics of the foreground and background to achieve a desired characteristic.

Adjustments may be performed to multiple cameras or displays. For example, lighting level in a portion of the videoconference site may be set using the signal from a first camera for sensing. Additional cameras may then be adjusted to match the same signal level.

Consistency in the appearance of portions of the image can be defined in various ways. For example, scene lighting levels may be defined with reference to a particular video signal level within the video images, for example requiring a level of about 45 IRE for the background portion of the video image. More directly, lighting levels may be measured within the videoconference site using light meters, calorimeters, and the like. Consistency in appearance of image portions may be measured indirectly, for example by measuring levels on a display at a remote location, or subjective matching by a technician. It will be appreciated that electronic measurements of image appearance can prove helpful for automatic setup of the videoconference system.

Setting the lighting levels under automatic control can be particularly useful for large videoconference systems having many videoconference sites, as manual adjustment of many videoconference sites may consume considerable technician time. Adjustments of the lighting level, color, position, and the like can also be performed manually if desired.

One advantage of using lighting level adjustments to control the appearance of portions of the image is that lighting adjustments can be performed using inexpensive equipment. For example, for manual control, dimmer switches and the like may prove adequate. Control of lighting position, lighting intensity, and lighting color can also be performed automatically using relatively inexpensive equipment. Providing multiple lighting sources corresponding to individual areas within the videoconference site can allow for a wide range of adjustment to allow individual portions of the images to be matched to a desired level.

Control of the appearance of portions of the video images using environmental settings, rather than camera or display settings, may prove simpler and less expensive than electronic techniques. For example, in the physical environment of the videoconference site, scene segmentation is defined by the physical arrangement of objects and light sources within the room. By providing separate lighting of foreground, background, and other portions of the videoconference site, greater flexibility in matching scene appearance across multiple videoconference sites is possible.

In another embodiment, the video adjustment subsystem may include an electronic video editor (not shown) coupled to the video transmitter 34 or coupled to the video camera 32 to electronically modify the background portion of the video image while leaving the foreground portion unmodified. For example, specific video characteristics of the background portion of the video images may be detected and modified to achieve a desired background appearance. Electronic adjustments can include changing color levels, color balance, lighting, contrast, and the like. The video image transmitted from the videoconference site is thus modified to provide a consistent background appearance.

In another embodiment, the electronic video editor may be coupled to the video receiver 36 or coupled to the video display 38 or coupled to both. Electronic modification can be performed on received video images to achieve the desired background appearance.

Controlling the appearance of portions of the video images separately may be performed by or controlled by a software application. The software application can execute on computer components within the videoconferencing site, for example as software embedded within the video transmitter 34 or video receiver 36 or other devices. The software may execute on a general purpose processor or specialized processor. The software may be stored on a computer readable medium.

For example, a computer readable medium may include computer readable instructions for communicating with at least one other videoconference site to exchange video images to form a multipoint videoconference. For example, the instructions may provide for control of the operation of video cameras, video displays, video transmitters and video receivers. The instructions may also include performing operations such as MPEG encoding and decoding of the video images. The computer readable medium may also include computer readable instructions for controlling the appearance of a first portion of the video images separately from a second portion of the video images to achieve a consistent image appearance across the multipoint videoconferencing system. Various ways of controlling the appearance of portions of the video images are described above.

Finally, a method of making a multipoint videoconferencing system to enhance an illusion of physical presence in a common space for a multipoint videoconference will now be described. The method can include installing video equipment at a videoconferencing site. The video equipment can include at least a video camera and a video transmitter, the video equipment being capable of establishing a videoconference link with at least one other videoconference site. For example, various ways of establishing videoconference links are described above.

Another step of the method can include adjusting the video equipment to control the appearance of a background portion of the video images separately from a foreground portion of the video images to achieve a consistent background appearance across the multipoint video conferencing system. For example, adjustments can include changes in intensity, color, and position of light sources within the videoconference site. Separate light sources can be used to illuminate the foreground and background areas within the videoconference site. Various other approaches for controlling the appearance of the background portion of the video images separately from the foreground portion are described above.

A consistent background appearance can be based on defining a desired background image for use across the multipoint videoconferencing system. The background image can be defined, for example, in terms of texture, colors, lighting levels, and the like. As described above, adjustments to the videoconference equipment can be made to achieve the desired background image.

Summarizing and reiterating to some extent, techniques for enhancing the illusion of physical presence in a common space for multipoint videoconferencing have been invented. The techniques can include controlling the appearance of a background portion of video images separately from a foreground portion to enable a consistent background appearance across multiple videoconference sites. Background and foreground appearance can be adjusted based on lighting levels and colors within the videoconference site, for example, by providing separate lighting controls for foreground and background areas of the videoconference site. Alternately, appearance of the background and foreground can be adjusted electronically. By matching background appearance across the different videoconference sites, the appearance of being in a common area is enhanced for participants in the videoconference, even though they may be separated by large distances.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method of enhancing the illusion of physical presence in a common space in a multipoint videoconferencing system comprising:
   a) measuring video characteristics of a first portion of a video image from a videoconference site;
   b) controlling the appearance of the first portion of the video image separately from a second portion of the video image to achieve an image appearance consistent with at least one other image from at least one other videoconference site within the multipoint videoconferencing system; and
   c) transmitting the video image from the videoconference site to the at least one other videoconference site.

2. The method of claim 1, wherein measuring video characteristics of the first portion of the video image comprises comparing a background portion of the video image to a desired background image.

3. The method of claim 1, wherein measuring video characteristics of the first portion of the video image comprises indirectly measuring a characteristic of the first portion of the video image.

4. The method of claim 1, wherein controlling the appearance of the first portion of the video image separately from the second portion comprises adjusting a lighting level of a corresponding area of the videoconference site separately from a lighting level in a foreground area of the videoconference site.

5. The method of claim 4, wherein the first portion of the video image is a background portion of the video image, the corresponding area of the videoconference site is a back wall of the videoconference site, and the second portion of the video image is a foreground portion of the video image.

6. The method of claim 1, wherein controlling the appearance of the first portion of the video image separately from the second portion comprises adjusting a lighting color on a back wall of the videoconference site separately from a lighting color in a foreground area of the videoconference site.

7. The method of claim 1, wherein controlling the appearance of the first portion of the video image separately from the second portion comprises electronically modifying the first portion of the video image while leaving the second portion unmodified.

8. The method of claim 1, wherein controlling the appearance of the first portion of the video image separately from a second portion comprises adjusting a foreground portion of the video image to achieve a desired characteristic.

9. The method of claim 1, wherein controlling the appearance of the first portion of the video image separately from a second portion is controlled by a calibration studio located remotely from the videoconference site.

10. A multipoint videoconferencing system to enhance an illusion of physical presence in a common space for multipoint videoconferencing comprising:
   a) a plurality of videoconference sites each being capable of direct communication with at least one other videoconference site to exchange video images in a multipoint videoconference, and
   b) a video adjustment subsystem coupled to at least one of the videoconference sites so as to control the appearance of a first portion of the video images separately from a second portion of the video images to achieve an image appearance consistent with at least one other image from the at least one other videoconference site within across the multipoint videoconferencing system.

11. The system of claim 10, wherein a videoconference site further comprises:
   a video camera for capturing outgoing video images within videoconference site;
   a video transmitter to transmit the outgoing video images to at least one other videoconference site;
   a video receiver to receive incoming video images from at least one other videoconference site; and
   a video display to display the incoming video images from at least one other videoconference site.

12. The system of claim 11, wherein the video adjustment subsystem comprises an electronic video editor coupled to either one of the video transmitter or the video receiver.

13. The system of claim 10, wherein the video adjustment subsystem is coupled to at least one light positioned to light a back wall of the videoconference site.

14. A method of making a multipoint videoconferencing system to enhance an illusion of physical presence in a common space for multipoint videoconferencing comprising:
   a) installing video equipment at a videoconferencing site, the video equipment including at least a video camera and a video transmitter, the video equipment being capable of establishing a videoconference link with at least one other videoconference site to exchange video images;
   b) adjusting the video equipment to control the appearance of a first portion of the video images separately from a second portion of the video images; and
   c) providing an image appearance consistent with at least one other image from the at least one other videoconference site within the multipoint videoconferencing system.

15. The method of claim 14 wherein the first portion is a background portion and the second portion is a foreground portion.

16. The method of claim 14 further comprising defining a desired background image for use across the multipoint videoconferencing system.

17. The method of claim 14, further comprising controlling the adjustment of the video equipment using a calibration studio located remotely from the videoconference site.

18. A videoconference site for a multipoint videoconferencing system to enhance an illusion of physical presence in a common space during a multipoint videoconference comprising:
   a) means for communication with at least one other videoconference site to exchange video images to form a multipoint videoconference; and
   b) means for controlling the appearance of a first portion of the video images separately from a second portion of the video images by adjusting a lighting level of a corresponding area of the videoconference site separately from a lighting level in a foreground area of the videoconference site to an image appearance consistent with at least one other image from the at least one other videoconference site within the multipoint videoconferencing system.

19. A computer readable medium having computer readable instructions embodied thereon for enhancing the illusion of physical presence in a common space during a multipoint video conference comprising:
   a) computer readable instructions for communicating with at least one other videoconference site to exchange video images to form a multipoint videoconference at videoconference site; and
   b) computer readable instructions for controlling the appearance of a first portion of the video images separately from a second portion of the video images by adjusting a lighting level of a corresponding area of the videoconference site separately from a lighting level in a foreground area of the videoconference site to achieve an image appearance consistent with at least one other image from the at least one other videoconference site within the multipoint videoconferencing system.

20. The computer readable medium of claim 19, wherein the computer readable instructions for controlling the appearance of a first portion of the video images separately from a second potion of the video images comprises computer readable instructions for adjusting a lighting level of a back wall area of the videoconference site.

* * * * *

UNITED STATES PATENT AND TRADEMARK OFFICE
CERTIFICATE OF CORRECTION

PATENT NO. : 7,924,306 B2
APPLICATION NO. : 11/521634
DATED : April 12, 2011
INVENTOR(S) : Jeffrey Thielman et al.

Page 1 of 1

It is certified that error appears in the above-identified patent and that said Letters Patent is hereby corrected as shown below:

In column 7, line 36, in Claim 10, after "within" delete "across".

Signed and Sealed this
Thirteenth Day of September, 2011

David J. Kappos
*Director of the United States Patent and Trademark Office*